US011960867B1

(12) United States Patent
Singh et al.

(10) Patent No.: US 11,960,867 B1
(45) Date of Patent: *Apr. 16, 2024

(54) USING NATURAL LANGUAGE LATENT REPRESENTATION IN AUTOMATED CONVERSION OF SOURCE CODE FROM BASE PROGRAMMING LANGUAGE TO TARGET PROGRAMMING LANGUAGE

(71) Applicant: GOOGLE LLC, Mountain View, CA (US)

(72) Inventors: Rishabh Singh, San Jose, CA (US); Hanjun Dai, San Jose, CA (US); Manzil Zaheer, Mountain View, CA (US); Artem Goncharuk, Mountain View, CA (US); Karen Davis, Portola Valley, CA (US); David Andre, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,674

(22) Filed: May 17, 2023

Related U.S. Application Data

(63) Continuation of application No. 17/319,739, filed on May 13, 2021, now Pat. No. 11,693,637.
(Continued)

(51) Int. Cl.
*G06F 8/30* (2018.01)
*G06F 8/41* (2018.01)
(Continued)

(52) U.S. Cl.
CPC ............ *G06F 8/436* (2013.01); *G06F 40/279* (2020.01); *G06F 40/40* (2020.01); *G06N 3/08* (2013.01); *G06N 7/01* (2023.01)

(58) Field of Classification Search
CPC ........................................................ G06F 8/30
See application file for complete search history.

(56) References Cited

U.S. PATENT DOCUMENTS

| | | | |
|---|---|---|---|
| 8,498,986 B1 * | 7/2013 | Botros ................. | G06F 16/285 |
| | | | 707/737 |
| 2011/0191275 A1 | 8/2011 | Lujan | |

(Continued)

OTHER PUBLICATIONS

Piech et al., "Human Languages in Source Code: Auto-Translation for Localized Instruction" arXiv:1909.04556v1 [cs.CL] dated Sep. 10, 2019. 7 pages.

Blasi et al., "Translating Code Comments to Procedure Specifications" Proceedings of 27th ACM SIG-SOFT International Symposium on Software Testing and Analysis (ISSTA' 18) ACM, New York, NY. 12 pages. https://doi.org/10.1145/3213846.3213872 dated 2018.

(Continued)

*Primary Examiner* — Jae U Jeon
(74) *Attorney, Agent, or Firm* — Gray Ice Higdon

(57) ABSTRACT

Using a natural language (NL) latent presentation in the automated conversion of source code from a base programming language (e.g., C++) to a target programming language (e.g., Python). A base-to-NL model can be used to generate an NL latent representation by processing a base source code snippet in the base programming language. Further, an NL-to-target model can be used to generate a target source code snippet in the target programming language (that is functionally equivalent to the base source code snippet), by processing the NL latent representation. In some implementations, output(s) from the NL-to-target model indicate canonical representation(s) of variables, and in generating the target source code snippet, technique(s) are used to match those canonical representation(s) to variable(s) of the base source code snippet. In some implementations, multiple candidate target source code snippets are generated, and a subset (e.g., one) is selected based on evaluation(s).

18 Claims, 7 Drawing Sheets

Related U.S. Application Data

(60) Provisional application No. 63/025,816, filed on May 15, 2020.

(51) Int. Cl.
  *G06F 40/279* (2020.01)
  *G06F 40/40* (2020.01)
  *G06N 3/08* (2023.01)
  *G06N 7/01* (2023.01)

(56) References Cited

U.S. PATENT DOCUMENTS

| | | | |
|---|---|---|---|
| 2015/0242396 | A1 | 8/2015 | Su |
| 2018/0174047 | A1 | 6/2018 | Bourdev |
| 2019/0129947 | A1* | 5/2019 | Shin .................. G06F 40/58 |
| 2019/0228319 | A1* | 7/2019 | Gupta ................. G06F 8/71 |
| 2020/0380415 | A1* | 12/2020 | Siracusa ............... G06F 8/35 |
| 2021/0303989 | A1* | 9/2021 | Bird .................. G06F 16/3344 |

OTHER PUBLICATIONS

Rabin et al., "Testing Neural Program Analyzers" arXiv:1908.10711v2 [cs.LG] dated Sep. 25, 2019. 3 pages.

Aggarwal et al., "Using Machine Translation for Converting Python 2 Python 3 Code" PeerJ PrePrints. https://dx.doi.org/10.7287/peerj.preprints.1459v1. CC-BY 4.0 Open Acess dated Oct. 29, 2015. 4 pages.

Barone et al., "A parallel corpus of Python functions and documentation strings for automated code documentation and code generation" arXiv:1707.02275v1 [cs.CL] dated Jul. 7, 2017. 5 pages.

Saez et al., "Towards the detection of cross-language source code reuse" En Natural Language Processing and Information Systems. Springer Verlag (Germany). 6716:250-253. doi:10.1007/978-3-642-22327-3_31. 5 pages.

Bui "Towards Zero Knowledge Learning for Cross Language API Mappings" 2019 IEEE/ACM 41st International Conference on Software Engineering: Companion Proceedings (ICSE-Companion) 3 pages dated 2019.

* cited by examiner

DOES TARGET SOURCE CODE SNIPPET CONFORM TO SYNTAX OF TARGET PROGRAMMING LANGUAGE? 602

CAN TARGET SOURCE CODE SNIPPET BE COMPILED USING TARGET PROGRAMMING LANGUAGE COMPILER? 604

DOES OUTPUT OF TARGET SOURCE CODE SNIPPET, IF COMPILED AND EXECUTED, MATCH OUTPUT OF BASE SOURCE CODE SNIPPET IF COMPILED AND EXECUTED? 606

CONSIDER MULTIPLE OUTPUT(S) EACH BASED ON DIFFERENT VALUE(S) FOR VARIABLE(S) 606A

HOW DISTANT, IN EMBEDDING SPACE, IS GENERATED EMBEDDING OF TARGET SOURCE CODE SNIPPET TO GENERATED EMBEDDING OF BASE SOURCE CODE SNIPPET? 608

WHAT IS SIZE AND/OR COMPLEXITY OF TARGET SOURCE CODE SNIPPET? 610

FIG. 6

USING NATURAL LANGUAGE LATENT REPRESENTATION IN AUTOMATED CONVERSION OF SOURCE CODE FROM BASE PROGRAMMING LANGUAGE TO TARGET PROGRAMMING LANGUAGE

BACKGROUND

Computer software programming often requires developers to read and/or write source code (i.e., to program) in a specific higher-level programming language. Some non-limiting examples of higher-level programming languages include Java, C++, C, Python, Perl, etc.—each of which can have its own strengths, weaknesses, nuances, idiosyncrasies, etc.

Many programmers obtain at least a superficial understanding of multiple programming languages, but only master a few. Consequently, this can cause problems when an entity (e.g., a company) wants to translate code from a base higher-level programming language to a different target programming language. For example, existing programmers at the entity may lack expertise in the target programming language and be unable to manually translate the code and/or can be highly inefficient in doing so. The inefficiencies can lead to excess usage of client device resources utilized in translating the code. Put another way, the inefficiencies can result in a client device, being used in manually translating the code, to be on and/or in a higher-powered state for prolonged periods. Even if new programmer(s) familiar with the target language were brought in for the translating, manually translating is nonetheless still inefficient, at least due to the new programmers being unfamiliar with the semantics of the base code being translated. Even outside of the automatic translating context, excess usage of client device resources can also occur when programmers attempt to code in a new language with which they have lesser expertise relative to other language(s). This can be due to the programmers being slower when coding in the new language which, in turn, prolongs the duration that client device resource(s) need to be active when coding in the new language.

SUMMARY

Implementations disclosed herein relate to utilization of machine learning model(s) (e.g., neural network model(s)) in automatically translating source code in a "base" programming language to source code in another programming language, or "target" programming language. Implementations disclosed herein can enable automatic translation of source code from the base programming language to the target programming language, while mitigating the amount of programmer time (and corresponding client device usage) that is involved. For example, some or all snippets of source code can be translated from the base programming language to the target programming language, without requiring any human intervention. For instance, a translated target language snippet can optionally be presented to a programmer for review and potential editing, but the programmer will not be involved in the generation of the translated target language snippet.

As described herein, the machine learning model(s) that are utilized in translating base source code to target source code can be trained based on actual human-created code. As a result, generated target source code snippets can be more natural and, as a result, comprehensible by developers in a more efficient manner—which results in more efficient usage of client device resource(s) in reviewing and/or editing the target source code snippets. For example, generated target source code snippets can be more natural than those generated using only rules-based approaches.

Moreover, and as also described herein, the machine learning models(s) that are utilized in translating base source code to target source code can include a base-to-natural language (NL) model and an NL-to-target model. The base-to-NL model can be trained based on training instances that include automatically generated base source code snippet, natural language pairs and the NL-target model can be trained based on training instances that include automatically generated natural language, base source code snippet pairs. In these and other manners, there is not a need for any training instances that directly pair a base source code snippet with a corresponding target source code snippet. Accordingly, the resource intensive task of human supervised pairing of base, target pairs is obviated—and techniques described herein can be utilized to translate between a base programming language and a target programming language even when base, target pairs are not conceptually and/or practically existent.

Implementations disclosed herein can additionally or alternatively enable programmers who might be unfamiliar with a base programming language to nonetheless view and/or edit source code written in the base programming language by translating the source code to another programming language that is more familiar to the programmer.

In automatically translating a base source code snippet, programmed in a base programming language (e.g., C++), the base source code snippet can be processed, using a base-to-natural language (base-to-NL) neural network model, to generate a sequence of outputs, such as a sequence of outputs that each include a probability distribution over tokens. Each of the tokens can be a word, word piece, symbol, and/or other token, and the tokens can include those that form a natural language lexicon, and optionally other tokens (e.g., end of sentence symbols, space symbols, canonical variables and/or other variables, etc.). The base-to-NL neural network model can be, for example, a transformer, an RNN encoder-decoder model that includes memory layer(s), and/or other neural network model architecture(s).

The generated sequence of outputs can be used to generate a natural language output that is descriptive of the base source code snippet. For example, the natural language output can be generated as a sequence of tokens, where each token in the sequence is selected based at least in part on the probability distribution for a corresponding one of the outputs. For instance, the natural language output can be generated, token-by-token, by selecting the highest probability token for each output of the sequence. The generated natural language output can optionally include one or more terms that are also included in the base source code snippet, but the generated natural language output does differ from the base source code snippet. Moreover, the generated natural language output does not fully conform to a syntax of the base programming language (i.e., would lead to a failure if compiled using a compiler for the base programming language).

As described herein, in various implementations the base-to-NL neural network model can be trained for use in processing base source code snippets to generate corresponding natural language output that is descriptive of, but differs from, the base source code snippet. The base-to-NL neural network can be trained based at least in part on training instances that each include training instance input of a corresponding base source code snippet and training instance output of a corresponding natural language descriptor of the base source code snippet. In some of those implementations, a natural language descriptor of training instance output of a training instance can be generated based on a document string (also referred to herein as a docstring) that corresponds to the base source code snippet of the training instance input of the training instance. For example, the docstring can be one crafted by a developer to describe the general functionality of the base source code snippet. In some versions of those implementations, a base source code snippet and a docstring for the base source code snippet are identified from a repository (e.g., an online repository of code) and can be utilized to generate multiple disparate training instances for training the base-to-NL neural network. Various example techniques for generating multiple disparate training instances, from a single source code snippet and docstring pair, are described in more detail herein.

The natural language output, generated by processing the base source code snippet using the base-to-NL neural network model, can then be processed using an NL-to-target neural network model to generate a sequence of outputs, such as a sequence of outputs that each include a probability distribution over tokens. Each of the tokens can be a word, word piece, symbol, and/or other token, and the tokens can include those that form a lexicon of a target higher-level programming language, and optionally other tokens (e.g., end of code snippet symbols, canonical variables and/or other variables, etc.). It is noted that the lexicon of the target higher-level programming language can differ from the lexicon of the natural language lexicon and can also differ from the lexicon of other higher level source codes. The NL-to-target neural network model can be, for example, a transformer, an RNN encoder-decoder model that includes memory layer(s), and/or other neural network model architecture(s).

A target source code snippet, in the target language, can then be generated based on the output(s) generated by processing the natural language output using the NL-to-target neural network model. For example, where the output (s) include a sequence of output(s), the target source code snippet can be generated, token-by-token, by selecting the highest probability token for each output of the sequence.

As described herein, in various implementations the NL-to-target neural network model can be trained for use in processing natural language snippets to generate corresponding target source code snippets. The NL-to-target neural network model can be trained based at least in part on training instances that each include training instance input of a natural language descriptor of a corresponding target source code snippet, and training instance output of the corresponding target source code snippet. In some of those implementations, a natural language descriptor of training instance input of a training instance can be generated based on a docstring that corresponds to the target source code snippet of the training instance output of the training instance. For example, the docstring can be one crafted by a developer to describe the general functionality of the target source code snippet. In some versions of those implementations, a target source code snippet and a docstring for the base source code snippet are identified from a repository (e.g., an online repository of code) and can be utilized to generate multiple disparate training instances for training the NL-to-target neural network. Various example techniques for generating multiple disparate training instances, from a single source code snippet and docstring pair, are described in more detail herein.

The generated target source code snippet can then be rendered as output of a software development application for optional review and/or editing by developer(s). For example, an entire program, or module, can be automatically translated from a base programming language (e.g., C++) to a target language (e.g., Python) by automatically translating snippets as described above. Each of the snippets can be, for example, a line of code, a portion of a line of code, multiple lines of code, and/or other contiguous portion of code.

As mentioned above, various techniques can be utilized in generating, from a single source code snippet and docstring pair, multiple disparate training instances that can be used to train a base-to-NL neural network model and/or an NL-to-target neural network model. Utilization of such techniques can enable computationally efficient generation of additional training instances. Further, utilization of one or more of such techniques can enable generation of more diverse training instances. The additional quantity of training instances and/or increased diversity of the training instances can, when used to train a base-to-NL and/or NL-to-target neural network model, result in the respective model(s) being more robust and/or accurate.

Some example techniques are now described. For ease of explanation, a working example of a source code snippet of "double add(double a, double b) {return a+b}" and a docstring of "sum of two numbers—a and b" will be utilized. Further, examples will be given of training instances for a base-to-NL neural network model. However, it is noted that training instances for an NL-to-target neural network model can likewise be generated (i.e., by flipping the inputs/outputs of the training instances).

One example technique is variable renaming. With variable renaming, variable name(s) in the source code snippet can be replaced with alternate variable name(s) and, if corresponding variables are present in the docstring, they will also be replaced with the alternate variable name(s). For example, a training instance generated based on the working example can have input of: "double add(double height, double width) {return height+width}" and output of: "sum of two numbers—height and width". As another example, a second training instance generated based on the working example can have input of "double add(double a, double width) {return a+width}" and output of: "sum of two numbers—a and width".

Another example technique is type signature mutations. Typically, the types mentioned in docstrings correspond to the types used in method signatures of corresponding programs. With the type signature transformation, coordinated changes are performed to the types in both docstring and program code. For example, the double type can be replaced with integer type in docstring and program source to obtain new training examples. For instance, a training instance generated based on the working example can have input of: "integer add(double a, double b) {return a+b}" and output of: "sum of two numbers—a and b"

Another example technique is dropping term(s) from a docstring (e.g., stop word(s)), adding term(s) to a docstring (e.g., stop word(s)), replacing term(s) from a docstring with synonym(s), and/or using a paraphrasing algorithm to paraphrase a docstring. For example, a training instance generated based on the working example can have output of "sum two numbers—a and b" (drops "of"). As another example, a training instance generated based on the working example can have output of "add two numbers—a and b" (replaces "sum" with the synonym "add", and drops stop word "of"). As another example, a training instance generated based on the working example can have output of "sum of two numbers" (e.g., generated using a paraphrasing algorithm). As yet another example, a training instance generated based on the working example can have output of "add two numbers—a b" (replaces "sum" with the synonym "add", and drops stop word(s) "of" and "and").

Another example technique is concatenating two or more source code snippets and concatenating two or more docstrings, and generating a training instance that includes input or output that is based on the concatenated source code snippets a, and that includes the other of input or output that is based on the concatenated docstrings. Assume the working example of a source code snippet of "double add(double a, double b) {return a+b}" and a docstring of "sum of two numbers—a and b". Further assume an additional source code snippet of "void writeImage(std::string const & fileName) {B1}" and corresponding docstring of "Write an image to disk", where "B1" represents the function body (omitted herein for simplicity). In such an example, a training instance can be generated with training instance input of "void addAndWriteImage(double a, double b, const &fileName){return a+b; B1}" and with output of "sum of two numbers—a and b, and write an image to disk". Additional or alternative concatenations can be generated, based on two or more source code snippets and docstrings, by first modifying the source code snippet(s) and/or docstring(s) according to one or more other techniques described herein.

Another example technique is expansion of function call(s), in a source code snippet, with their definition. Various examples have been described above, and have been described in isolation for ease in explanation. However, it is understood that additional and/or alternative techniques can be utilized in generating multiple disparate training instances from a single source code snippet and docstring pair. Moreover, in various implementations multiple techniques can be combined in generating multiple disparate training instances. For example, variable renaming can be combined with dropping term(s) from a docstring. For instance, with the working example, a training instance can have input of: "double add(double height, double width)" and output of: "sum two numbers—height width" (variables "a" and "b" renamed to "height" and "width" and stop words "of" and "and" dropped from docstring).

In some additional or alternative implementations, the base code snippet that is processed using the base-to-NL neural network model can be a modified base code snippet that is generated by replacing occurrences of variable(s) in the snippet, with a corresponding canonical representation selected from a closed set of canonical representations. For example, the base code snippet "Subtract3(double a) {return a—3}" can be modified by replacing the variable "a" with the canonical representation "v1", resulting in the modified base code snippet "Subtract3(double v1) {return v1-3}". Accordingly, the natural language description, generated by processing using the base-to-NL neural network model, will be generated based on the canonical representation "v1" in lieu of the actual variable "a". It is noted that the canonical representation "v1" may or may not actually be present in the generated natural language description but, nonetheless, the natural language description will be influenced by inclusion of "v1" in lieu of "a". Further, the training instances used in training the base-to-NL neural network model and/or the NL-to-target neural network model can also optionally be trained based on training instances that include similarly generated canonical variable target source code snippets and natural language descriptions based on those canonical variable target source code snippets. Accordingly, the NL-to-target can likewise be trained to process natural language that include the canonical representations in lieu of actual variable names, and to generate target source code snippets that include the canonical representations in lieu of actual variable names.

The canonical representation(s), present in initial target source code snippets generated by processing using the NL-to-target neural network model, can then be modified by replacing the canonical representation(s) with the corresponding variable names from the base source code snippet. The modified target source code snippet can then be the one that is presented to developer(s) in a developer interface. In these and other manners, the viewed translated modified target source code snippets will be more intelligible when reviewed by developer(s) and, further, will maintain consistent variable names with other translated target source code snippets. Yet further, using the canonical representations, in lieu of the actual variable names, can enable the base-to-NL model and/or the NL-to-target model to be more robust and/or trained more quickly.

It is noted that, in some implementations, there may not be a strict 1:1 mapping between the canonical representation(s) of the base code snippet and the canonical representation(s) of the initial target source code snippet. For example, assume canonical representations of "v1" for a first variable and "v2" for a second variable, in the base source code snippet. There may not be a guarantee that "v1" in the initial target source code snippet corresponds to "v1" in the base source code snippet and it may even be the case that "v1" is not even present in the initial target source code snippet (e.g., "v3" or "x1" or other canonical representation may be present in lieu of "v1"). When there is only one variable in the base source code snippet, and only one canonical representation in the modified source code snippet and one canonical representation (matching or not) in the initial target source code snippet, it can easily be determined that the canonical representation in the initial target source snippet matches the variable of the base source code snippet. However, it can be more difficult when multiple variables are present.

This can include considering the sequential order of the variables in the base source code snippet and the sequential order of the canonical representations in the initial target source code snippet. This can additionally or alternatively include considering corresponding types assigned to the variables in the base source code snippet and types assigned to the canonical representations in the initial target source code snippet. This can additionally or alternatively include considering other portion(s) of code preceding and/or following the variables in the base source code snippet and other portion(s) of code preceding and/or following the canonical representations in the initial target source code snippet. This can additionally or alternatively include, for a given variable mapping in the target source code snippet (i.e., a given replacement of canonical representations with variables), generating output(s) that are each based on executing the target source code snippet (with the given variable mapping) with test input(s) (e.g., certain values for the variables). Output(s) can likewise be generated for the initial base source code snippet, using the same test input(s). The base output(s) generated for the base source code snippet can be compared to the target output(s) generated for the target source code snippet. If the base output(s) match the target output(s), this can indicate that the given variable mapping is correct—and it can be utilized.

In some additional or alternative implementations, where the output(s) from the NL-to-target neural network model include a sequence of output(s) and probability distributions, an additional target source code snippet can be at least selectively generated by selecting token(s) that are not the highest probability token for the output(s) of the sequence. For example, an additional target source code snippet can include one or more (e.g., a subset or all) of the second-highest probability tokens in lieu of the highest probability tokens.

In some of those implementations, the additional target source code snippet can be selectively utilized, in lieu of the higher probability target source code snippet that is based on the highest probability tokens. For example, the additional snippet can be utilized if it conforms more closely to syntax of the target programming language than does the initial target source code snippet. As another example, the additional snippet can be utilized if it can be compiled using compiler(s) for the target programming language whereas the initial target source code snippet cannot be compiled using the compiler(s) (e.g., it generates error(s)).

As another example, the base source code snippet can additionally or alternatively be executed (e.g., compiled then executed), with given value(s) for any variable(s), to generate base source code output. Further, the highest probability source code snippet can likewise be executed to generate first target output and the additional target source code snippet can likewise be executed to generate second target output. If the first target output fails to match the base source code output, but the second target output (for the additional target source code snippet) matches the base source code output (or matches it more closely), the additional source code snippet can be utilized in lieu of the highest probability source code snippet.

As yet another example, an embedding for the base source code snippet can additionally or alternatively be generated (e.g., using code2vec or other model(s)), and embeddings similarly generated for the initial target source code snippet and the additional target source code snippet. The additional target source code snippet can be utilized, in lieu of the initial target source code snippet, if its embedding is closer (distance-wise in embedding space) to the base source code snippet than is the embedding for the initial target source code snippet. In these and other manners multiple candidate target snippets can be generated utilizing the neural decompiler, evaluated according to one or more criteria, and the best (according to the evaluation) target snippet selected for presentation in a developer interface. In some implementations the additional target source code snippet(s) are only generated and/or evaluated responsive to determining that the highest probability target source code snippet fails to satisfy one or more criteria.

The preceding is provided as an overview of only some implementations disclosed herein. These and other implementations are described in additional detail in the detailed description and in the claims.

In addition, some implementations include one or more processors (e.g., CPU(s), GPU(s), and/or TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6 illustrates example blocks that may be performed in evaluating a target source code snippet, alone or in relation to other target source code snippet(s).

DETAILED DESCRIPTION

Figure 1:
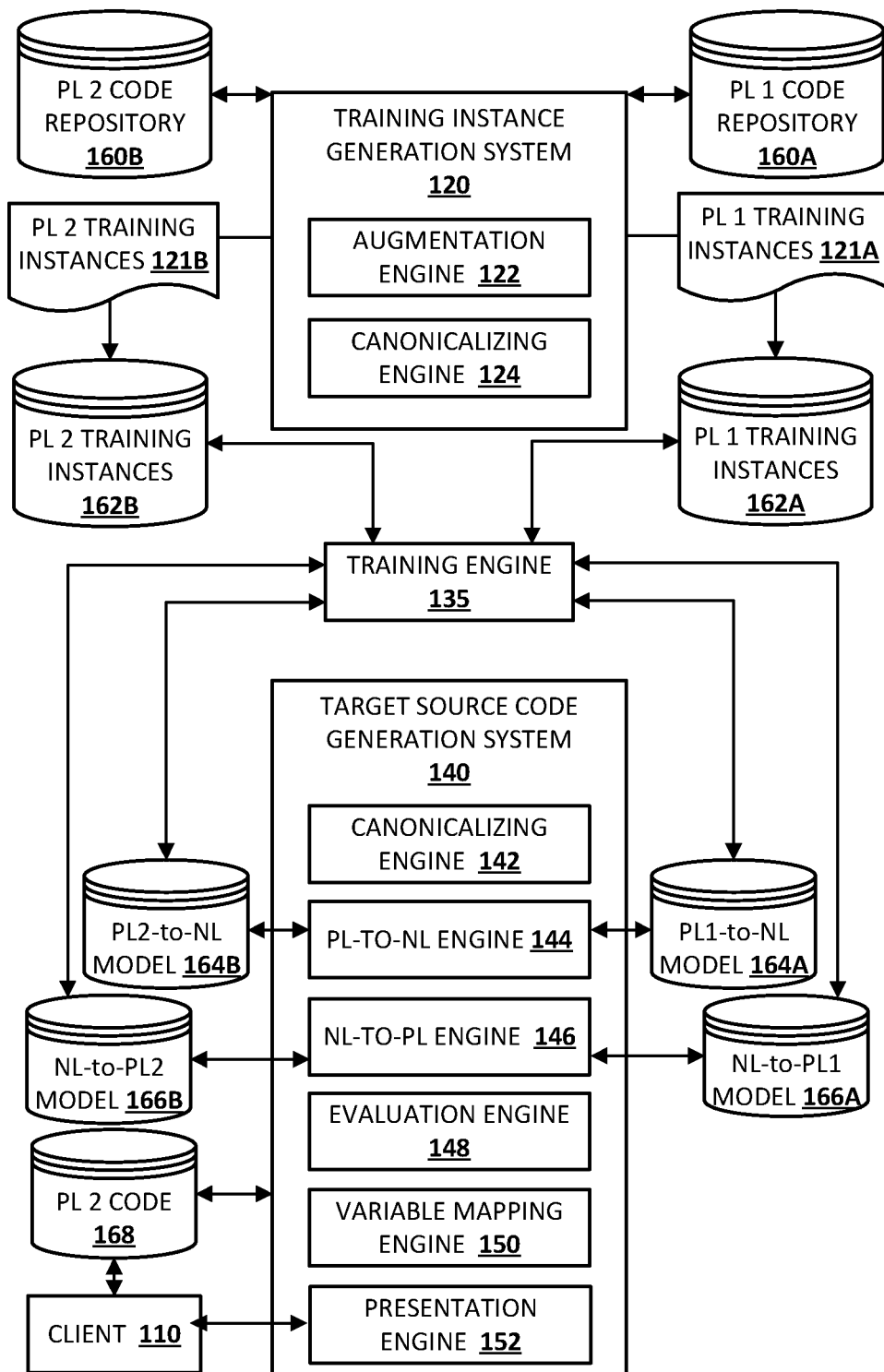
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices, systems, and engines depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems and/or engines depicted in FIG. 1, such as training instance generation system 120, target source code generation system 140, and training engine 135 can be implemented using one or more server computing devices that form what is sometimes referred to as a "cloud infrastructure," although this is not required.

Training instance generation system 120 of FIG. 1 can utilize a first programming language ("PL 1" or "PL1") code repository 160A, and/or other repository/repositories for PL 1, in generating training instances 121A. The code repository 160A (and/or other repositories for PL 1) can include one or more publicly accessible Internet repositories and/or one or more access-restricted repositories that each include multiple instances of programs, functions, and/or line(s) of code that are each crafted, by a corresponding developer, in the first programming language. The code repository 160A (and/or other repositories for PL 1) can further include docstrings, where each of the docstrings is for a corresponding source code snippet. For example, a given docstring can be one crafted by a developer to describe the general functionality of a corresponding base source code snippet.

The training instances 121A that are generated by the training instance generation system 120 can include PL1-to-NL training instances that each include: (a) training instance input that includes a source code snippet in PL1; and (b) training instance output that includes a natural language description of the source code snippet. The training engine 135 can use the PL1-to-NL training instances to train the PL1-to-NL model 164A. The training instances 121A that are generated by the training instance generation system 120 can additionally or alternatively include NL-to-PL1 training instances that each include: (a) training instance input that includes a natural language description of a source code snippet in PL1; (b) training instance output that includes the source code snippet in PL1. The training engine 135 can use the NL-to-PL1 training instances to train the NL-to-PL1 model 166A. In some implementations, the PL1-to-NL training instances and the NL-to-PL1 training instances are the same, but for their inputs/outputs being swapped. The source code snippets of the training instances 121A can each be based on (e.g., conform to, or derived from) a corresponding snippet of PL 1 code from the repository 160A (or other repository) and the natural language descriptions of the training instances 121A can each be based on (e.g., conform to, or derived from) a corresponding docstring from the repository 160A (or other repository).

The PL1-to-NL model 164A can be a neural network model and, when trained, can be used to generate a natural language description of a source code snippet that is programmed in PL 1. For example, the PL1-to-NL model 164A can be a sequence-to-sequence neural network model that processes a source code snippet programmed in PL 1 to generate a sequence of outputs, such as a sequence of outputs that each include a probability distribution over tokens. For instance, the PL1-to-NL model 164A can be a transformer, an RNN encoder-decoder model that include memory layer(s), and/or other neural network model architecture(s). Each of the tokens represented by the output can be a word, word piece, symbol, and/or other token, and the tokens can include those that form a natural language lexicon, and optionally other token(s).

The sequence of outputs generated using PL1-to-NL model 164A can be used to generate a natural language output that is descriptive of processed base source code snippet. For example, the natural language output can be generated as a sequence of tokens, where each token in the sequence is selected based at least in part on the probability distribution for a corresponding one of the outputs. For instance, the natural language output can be generated, token-by-token, by selecting the highest probability token for each output of the sequence.

The NL-to-PL1 model 166A can be a neural network model and, when trained, can be used to generate a source code snippet that is in PL 1. For example, the NL-to-PL1 model 166A can be a sequence-to-sequence neural network model that processes a natural language description to generate a sequence of outputs, such as a sequence of outputs that each include a probability distribution over tokens. For instance, the NL-to-PL1 model 166A can be a transformer, an RNN encoder-decoder model that include memory layer(s), and/or other neural network model architecture(s). Each of the tokens represented by the output generated using the NL-to-PL1 model 166A can be a word, word piece, symbol, and/or other token, and the tokens can include those that form a lexicon of a target higher-level programming language, and optionally other tokens (e.g., end of code snippet symbols, canonical variables and/or other variables, etc.). It is noted that the lexicon of the target higher-level programming language can differ from the lexicon of the natural language lexicon and can also differ from the lexicon of other higher level source codes. For example, the lexicon represented by NL-to-PL1 model 166A can differ from the lexicon represented by the PL1-to-NL model 164A and can differ from the lexicon represented by the NL-to-PL2 model 166B. Optionally, the lexicons represented by the NL-to-PL1 model 166A and the NL-to-PL2 model 166B can be the same.

Training instance generation system 120 of FIG. 1 can utilize a second programming language ("PL 2" or "PL2") code repository 160B, and/or other repository/repositories for PL 2, in generating training instances 121B. The code repository 160B (and/or other repositories for PL 2) can include one or more publicly accessible Internet repositories and/or one or more access-restricted repositories that each include multiple instances of programs, functions, and/or line(s) of code that are each crafted, by a corresponding developer, in the second programming language. The code repository 160B (and/or other repositories for PL 2) can further include docstrings, where each of the docstrings is for a corresponding source code snippet.

The training instances 121B that are generated by the training instance generation system 120 can include PL2-to-NL training instances that each include: (a) training instance input that includes a source code snippet in PL2; and (b) training instance output that includes a natural language description of the source code snippet. The training engine 135 can use the PL2-to-NL training instances to train the PL2-to-NL model 164B. The training instances 121B that are generated by the training instance generation system 120 can additionally or alternatively include NL-to-PL2 training instances that each include: (a) training instance input that includes a natural language description of a source code snippet in PL2; (b) training instance output that includes the source code snippet in PL2. The training engine 135 can use the NL-to-PL2 training instances to train the NL-to-PL2 model 166B. In some implementations, the PL2-to-NL training instances and the NL-to-PL2 training instances are the same, but for their inputs/outputs being swapped. The source code snippets of the training instances 121B can each be based on (e.g., conform to, or derived from) a corresponding snippet of PL 2 code from the repository 160B (or other repository) and the natural language descriptions of the training instances 121B can each be based on (e.g., conform to, or derived from) a corresponding docstring from the repository 160B (or other repository).

The generated training instances 121B are stored in PL 2 training instances database 162B and can be used by training engine 135 in training PL2-to-NL model 164B and/or NL-to-PL2 model 166B.

The PL2-to-NL model 164B can be a neural network model and, when trained, can be used to generate a natural language description of a source code snippet that is programmed in PL 2. For example, the PL2-to-NL model 164B can be a sequence-to-sequence neural network model that processes a source code snippet programmed in PL 2 to generate a sequence of outputs, such as a sequence of outputs that each include a probability distribution over tokens. For instance, the PL2-to-NL model 164b can be a transformer, an RNN encoder-decoder model that include memory layer(s), and/or other neural network model architecture(s). Each of the tokens represented by the output can be a word, word piece, symbol, and/or other token, and the tokens can include those that form a natural language lexicon, and optionally other token(s).

The sequence of outputs generated using PL2-to-NL model 164B can be used to generate a natural language output that is descriptive of processed base source code snippet. For example, the natural language output can be generated as a sequence of tokens, where each token in the sequence is selected based at least in part on the probability distribution for a corresponding one of the outputs. For instance, the natural language output can be generated, token-by-token, by selecting the highest probability token for each output of the sequence.

The NL-to-PL2 model 166B can be a neural network model and, when trained, can be used to generate a source code snippet that is in PL 2. For example, the NL-to-PL2 model 166B can be a sequence-to-sequence neural network model that processes a natural language description to generate a sequence of outputs, such as a sequence of outputs that each include a probability distribution over tokens. For instance, the NL-to-PL2 model 166B can be a transformer, an RNN encoder-decoder model that include memory layer(s), and/or other neural network model architecture(s). Each of the tokens represented by the output generated using the NL-to-PL2 model 166B can be a word, word piece, symbol, and/or other token, and the tokens can include those that form a lexicon of a target higher-level programming language, and optionally other tokens (e.g., end of code snippet symbols, canonical variables and/or other variables, etc.).

For the sake of simplicity, training instance generation system 120 is depicted in FIG. 1 along with components for the first programming language (i.e., PL 1 code repository 160A, PL 1 training instances database 162A, PL1-to-NL model 164A, and NL-to-PL1 model 166A) and components for the second programming language (i.e., PL 2 code repository 160B, PL 2 training instances database 162B, PL2-to-NL model 164B, and NL-to-PL2 model 166B). However, it is understood that in various implementations training instance generation system 120 can also be used to generate training instances for additional programming languages, and that such training instances can be used to train PL-to-NL and/or PL-to-NL models for each of those additional languages. For example, training instance generation system 120 can utilize similar techniques in generating training instances for a third programming language, a fourth programming language, a fifth programming language, etc. Further, in those implementations the training instances for each of the additional programming languages can be used by training engine 135 (or an additional training engine) in training a corresponding PL-to-NL and/or PL-to-NL for each of the additional programming languages.

As will be appreciated from the description herein, a PL-to-NL model for any given programming language can be paired with an NL-to-PL model for any additional programming language, to enable translation of source code snippets that are in the given language to source code snippets that are in the additional programming language.

Training instance generation system 120 is depicted in FIG. 1 as including an augmentation engine 122, and a canonicalizing engine 124. One or both of these components can be omitted from the training instance generation system 120 in various implementations.

The canonicalizing engine 124 is optional and can be used to modify an initial source code snippet and optionally its corresponding docstring (e.g., if it also include a variable included in the initial source code snippet), obtained from a respective repository (e.g., a PL 1 code snippet from PL 1 code repository 160A) by replacing any variable(s) in the source code snippet and the docstring with a corresponding canonical representation. For example, assume the source code snippet "double add(double a, double b) {return a+b}" and a corresponding docstring of "sum of two numbers—a and b". The canonicalizing engine 124 can canonicalize both by replacing the variables "a" and "b" with canonical representations, such as "v1" and "v2". This would result in a modified source code snippet "double add(double v1, double v2) {return v1+v2}" and a modified corresponding docstring of "sum of two numbers—v1 and v2". The corresponding canonical representations can optionally be selected from a closed set of canonical representations such as a closed set of {v1, v2, v3, . . . v10}.

A modified source code snippet and docstring, that is generated by canonicalizing engine 124 and includes the canonical representation(s) in lieu of the original variable(s), can be what is utilized in generating training instances (including augmented training instances) in lieu of the initial source code snippet and docstring. Accordingly, the docstrings and source code snippets of at least some of (e.g., all, or at least a majority of) the training instances can be generated based on canonical representations in lieu of actual variables. Training the PL-to-NL models and/or NL-to-PL models based at least in part on (or even exclusively based on) canonicalized training instances can result in such models being trained more efficiently (i.e., requiring fewer training instances) and/or can lead to such models being more robust and/or more accurate. This can be due to the canonicalizations enabling training to focus on predicting the non-variable portions and only a closed set of a limited quantity (e.g., 20 or fewer, 10 or fewer) of canonical representations of variable(s) without needing to focus on predicting disparate variables.

Further, this can also enable the output space (e.g., the quantity of tokens) of the NL-to-PL models to be more constrained as token(s) that may be present in initial variables, but are not included in the lexicon of a given PL of a given NL-to-PL model, need not be represented in the output space of the given NL-to-PL model. Yet further, as described herein, when a PL-to-NL model is utilized in processing source code snippet in a disparate language, such source code snippet can likewise be similarly canonicalized to replace variable(s) with canonical representation(s). Generating the NL representation, of such source code snippet, can improve the accuracy and/or robustness of the natural language description generated using the PL-to-NL model. As described herein, when an initially generated target source code snippet, generated using an NL-to-PL model, includes canonical representation(s), one or more techniques can be utilized to generate a modified target source code snippet that incorporates the correct variables (e.g., from the base source code snippet) in lieu of the canonical representation(s). The modified target source code snippet can be the one that is presented to developer(s) in development interfaces(s) and/or that is executed.

The augmentation engine 122 can be used to generate additional training instances that each include a modification of the source code snippet obtained from a repository (or a modification thereof generated by canonicalizing engine 124) and/or a modification of the docstring, for the snippet, also obtained from the repository (or modified docstring generated by canonicalizing engine 124). The modification(s) performed by the augmentation engine 122 can be in addition to and/or in lieu of the replacement of variable(s) with canonical representation(s) that is performed by the canonicalizing engine 124.

The modification(s) performed by the augmentation engine 122 can result in multiple additional training instances being generated from a single source code snippet, docstring pair. The additional training instances can be generated by the augmentation engine efficiently and without requiring any human intervention. Further, the augmentation technique(s) used in generating such additional training instances can include those that result in target source code snippet(s) that might otherwise be rare (or even non-existent) in the corresponding repositories. Using such training instances in training of the PL-to-NL and/or NL-to-PL models can increase robustness of such models.

Some example techniques that can be utilized by the augmentation engine 124 are described in more detail herein, and include: variable renaming, type signature mutations, dropping term(s) from a docstring, adding term(s) to a docstring, replacing term(s) from a docstring with synonym(s), using a paraphrasing algorithm to paraphrase a docstring, concatenating two or more source code snippets and concatenating two or more docstrings, and/or expansion of function call(s), in a source code snippet, with their definition. Additional and/or alternative techniques can be utilized in generating multiple disparate training instances from a single source code snippet and docstring pair.

Figure 2:
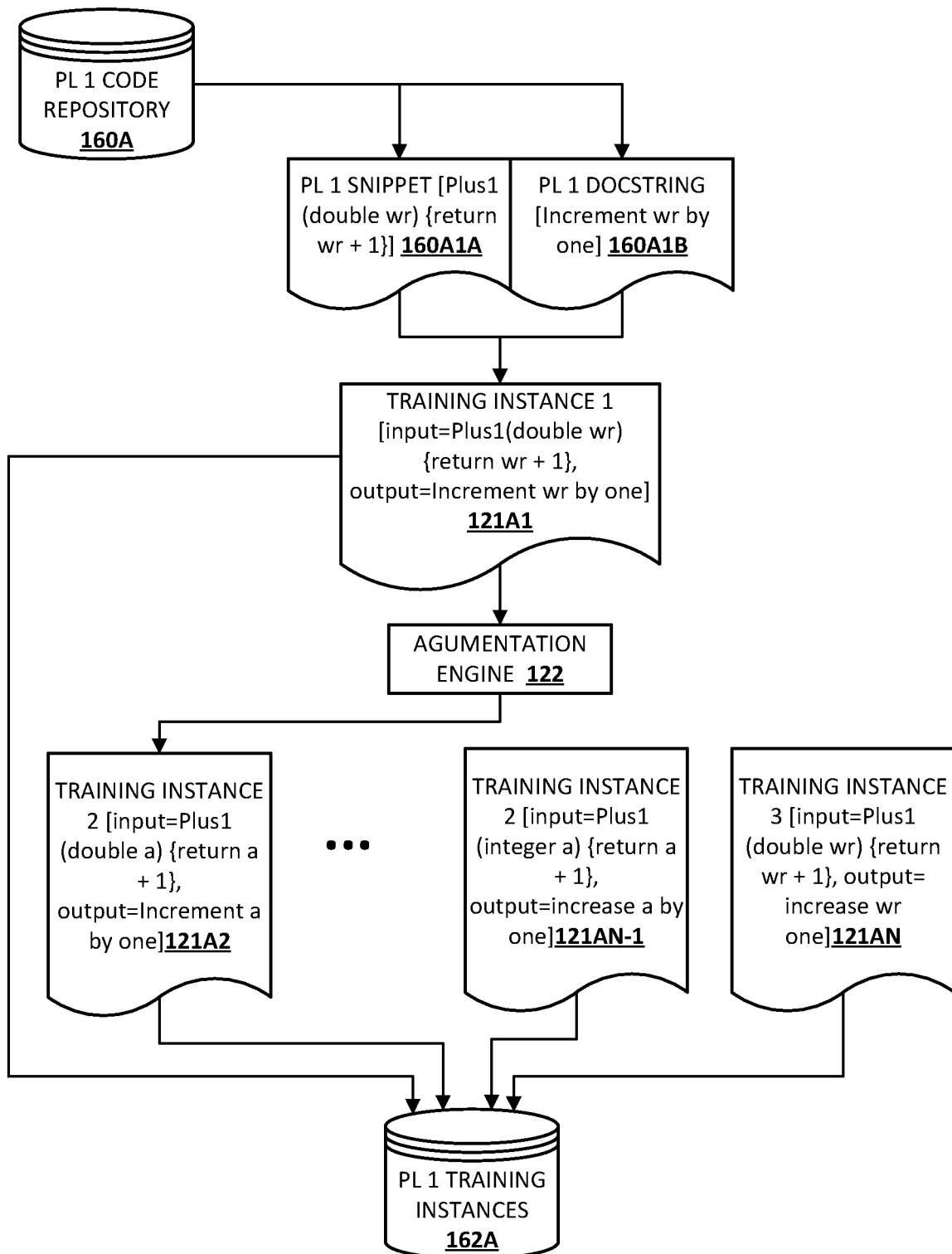
FIG. 2 is a block diagram showing an example of how components of the training instance generation system of FIG. 1 can generate training instances, in accordance with various implementations.

Turning briefly to FIG. 2, a block diagram is illustrated that shows an example of how components of the training instance generation system 120 can generate training instances 121A1-121AN, of training instances 121A, for storage in PL 1 training instances database 162A. It is noted that the illustrated training instances are for training the PL1-to-NL model 164A. However, the inputs/outputs of the training instances can be flipped to result in training instances that can be used to train the NL-to-PL1 model 166A. Moreover, although training instances 121B are not illustrated in FIG. 2, they can similarly be generated using source code snippets from PL 2 code repository 160B.

In FIG. 2, a PL 1 snippet 160A1A and a PL 1 docstring 160A1B for the PL 1 snippet 160A1A are obtained from PL 1 code repository 160A. As a working example, the PL 1 snippet 160A can be "Plus1(double wr) {return wr+1}" and the PL 1 docstring 160A1B can be "Increment number by one". The PL 1 snippet 160A1A and a PL 1 docstring 160A1B can be the initial ones stored in PL 1 code repository or, optionally, can be modifications thereof generated by canonicalizing engine 122. The PL 1 snippet 160A1A and a PL 1 docstring 160A1B can be used to generate a first training instance 121A1 that includes PL 1 snippet 160A1A as input and includes PL 1 docstring 160A1B as output.

Further, the augmentation engine 122 can generate a plurality of additional training instances 121A2-121AN based on performing augmentation technique(s) on the training instance 121A1. Three example augmented training instances 121A2, 121AN-1, and 121AN are illustrated, although more can be generated as indicated by the ellipsis.

The second training instance 121A2 is generated by the augmentation engine 122 by performing variable renaming. Namely, renaming the variable "wr" as "a" in both the source code snippet and the docstring. The N-1 training instance 121AN-1 is generated by the augmentation engine 122 by performing variable renaming, type signature mutation, and replacing a term from a docstring with a synonym. Namely, renaming the variable "wr" as "a" in both the source code snippet and the docstring, changing the "double" type to an "integer" type, and replacing "Increment" with the synonym "increase". The Nth training instance 121AN is generated by the augmentation engine 122 by performing replacing a term from a docstring with a synonym, and dropping term(s0 from the docstring. Namely, replacing "Increment" with the synonym "increase" and dropping the stop word "by" from the docstring. All of the training instances 121A1-AN can be stored in PL 1 training instances database 162A.

Referring again to FIG. 1, the training engine 135 can use the PL1 training instances 121A of PL1 training instances database 162A to train the PL1-to-NL model 164A and/or the NL-to-PL1 model 166A. The training engine 135 can use the PL2 training instances 121B of PL2 training instances database 162B to train the PL2-to-NL model 164B and/or NL-to-PL2 model 166B.

The target source code generation system 140 can use the trained PL1-to-NL model 164A and NL-to-PL2 model 166B in translating PL1 source code to PL2 source code. Moreover, the target source code generation system 140 can also use the PL2-to-NL model 164B and the NL-to-PL1 model 166A in translating PL2 source code to PL1 source code. For example, the target source code generation system 140 can obtain a source code snippet, programmed in PL 2, from PL 2 code database 166. Further, the target source code generation system 140 can use the PL2-to-NL model 164B to process the source code snippet and generate, based on output(s) from the processing, natural language that is descriptive thereof. The target source code generation system 140 can then process the natural language using the NL-to-PL1 model 166A to generate, based on output(s) from the processing, a source code snippet that is in PL1 and that is functionally equivalent to the source code snippet programmed in PL2.

Target source code generation system 140 is depicted in FIG. 1 as including a canonicalizing engine 142, a PL-to-NL engine 144, an NL-to-PL engine 146, an evaluation engine 148, a variable mapping engine 150, and a presentation engine 152. One or more of these components can be omitted from the target source code generation system 140 in various implementations.

The canonicalizing engine 142 can be used to modify an initial base source code snippet, such as a base source code snippet obtained from PL 2 code database 168 (or other database) by replacing any variable(s) with a corresponding canonical representation. The corresponding canonical representations can optionally be selected from a closed set of canonical representations such as a closed set of {v1, v2, v3, . . . v10}.

A base source code snippet, such as one generated by canonicalizing engine 142 and that includes the canonical representation(s) in lieu of the original variable(s), can be processed by the PL-to-NL engine 144 using a PL-to-NL model that is trained for the programming language of the base source code snippet. For example, for a base source code snippet obtained from PL 2 code database 168, the PL-to-NL engine 144 can process it using PL2-to-NL model 164B to generate output(s) and determine, based on the output(s), a natural language description of the base source code snippet. For example, where the output(s) include a sequence of output(s), the PL-to-NL engine 144 engine can generate a natural language description, token-by-token, by selecting the highest probability token for each output of the sequence.

The NL-to-PL engine 146 can process the generated natural language description using an NL-to-PL model that is trained for the target language to which the base source code snippet is to be translated. For example, the NL-to-PL engine 146 can process the natural language description using NL1-to-PL1 model 166A to generate output(s) and determined, based on the output(s) a target source code snippet that is in the target programming language. For example, where the output(s) include a sequence of output(s), the NL-to-PL engine 146 can generate a target source code snippet, token-by-token, by selecting the highest probability token for each output of the sequence. In some implementations, where the output(s) include a sequence of output(s) and probability distributions, the NL-to-PL engine 146 at least selectively generates an additional target source code snippet by selecting token(s) that are not the highest probability token for the output(s) of the sequence. For example, an additional target source code snippet can include one or more (e.g., a subset or all) of the second-highest probability tokens in lieu of the highest probability tokens.

The evaluation engine 148 can be utilized, by the NL-to-PL engine 146, in determining whether additional target source code snippet(s) should be generated. For example, the evaluation engine 148 can evaluate an initial (e.g., highest probability) target source code snippet and, if the evaluation fails to satisfy evaluation condition(s), can cause the NL-to-PL engine 146 to generate additional target source code snippet(s). This process can continue until a target source code snippet that satisfies the evaluation condition(s) is generated, a timeout condition occurs, a threshold quantity of additional target source code snippets have been generated, and/or other condition(s) occur.

In other implementations, the NL-to-PL engine 146 generates multiple target source code snippets initially (i.e., without prompting by the evaluation engine 148). In those implementations, the evaluation engine 148 can evaluate those multiple target source code snippets, serially (e.g., from highest to lowest probability) or in parallel, and select a subset (e.g., one) based on the evaluations. For example, the evaluation engine 148 can select the target source code snippet(s) that satisfy one or more (e.g., all) of the evaluation conditions. As another example, the evaluation engine 148 can select a single target source code snippet, from amongst two or more target source code snippets, by comparing respective metric(s) for their evaluations.

The evaluation condition(s) utilized by the evaluation engine 148 can include, for example, determining whether and/or how closely a target source code snippet conforms to syntax rules of the target programming language. For example, a first target source code snippet can be selected over an additional target source code snippet based at least in part on the first conforming more closely to syntax of PL 1 than does the additional target source code snippet. As another example, a first target source code snippet can be maintained in consideration for selection based at least in part on the first conforming to syntax of PL 1 and/or a second target source code snippet can be excluded from consideration for selection based at least in part on the second failing to conform to syntax of PL 1.

The evaluation condition(s) utilized by the evaluation engine 148 can additionally or alternatively include, for example, whether the target source code snippet can be compiled using compiler(s) for PL 1. For example, a first target source code snippet can be selected over an additional target source code snippet based on the first being compilable whereas the additional target source code snippet is not. As another example, a first target source code snippet can be maintained in consideration for selection based at least in part on the first being successfully compiled using a compiler for PL 1 and/or a second target source code snippet can be excluded from consideration for selection based at least in part on the second failing to compile using the compiler for PL 1.

The evaluation condition(s) utilized by the evaluation engine 148 can additionally or alternatively include, for example, comparing: (a) base output(s), generated using the base source code snippet with corresponding value(s) for variable(s) to (b) target output(s), generated using the target source code output. For example, a given target source code snippet can be executed with three different sets of variables to generate three different target outputs. If those target outputs all match base outputs generated by executing the base source code snippet with the three different sets of variables, the given target source code snippet can be more likely to be selected than if less than three (e.g., none) matched. For instance, two base outputs can be generated. The first base output can be generated by executing (e.g., after compiling) the base source code snippet a first time using "1" for a given variable of the base source code snippet. The second base output can be generated by executing (e.g., after compiling) the base source code snippet a second time using "3" for the given variable. Two target outputs can also be generated. The first target output can be generated by executing (e.g., after compiling) the target source code snippet a first time using "1" for the given variable of the target source code snippet. The second target output can be generated by executing (e.g., after compiling) the target source code snippet a second time using "3" for the given variable. The first and second base outputs can then be compared to the first and second target outputs in evaluating the target source code snippet.

The evaluation condition(s) utilized by the evaluation engine 148 can additionally or alternatively include, for example, generating an embedding for the base source code snippet and generating an embedding for a target source code snippet. The closer the two embeddings are, in embedding space, the more likely the target source code snippet can be to be selected. For example, if the embedding for the target source code snippet is closer, in embedding space, to the base source code snippet than is an additional embedding for an additional target source code snippet, the target source code snippet can be selected over the additional target source code snippet. As another example, if the embedding for the target source code snippet is not within a threshold distance, in embedding space, of the base source code snippet, then the target source code snippet can be excluded from selection. The embedding can be generated, for example, using code2vec, CodeBERT, or other model(s)). In some implementations a first base embedding for the base source code snippet can be generated using a first model (e.g., code2vec) and compared to a first target embedding for the target source code snippet, that is also generated using the first model. A second base embedding can also be generated using a second model (e.g., CodeBERT) and compared to a second target embedding generated using the second model. The evaluation of the target source code snippet can be based on comparison of the first base embedding to the first target embedding, as well as comparison of the second base embedding to the second target embedding.

The variable mapping engine 150 can, when an initially generated target source code snippet includes canonical representation(s), match the canonical representation(s) to corresponding variables of the base source code snippet of which the target source code snippet is generated. The variable mapping engine 150 can then generate a modified target source code snippet that replaces the canonical representation(s) with the corresponding variables. That modified target source code snippet can be what is presented in a developer interface and/or used for execution.

In some implementations, the variable mapping engine 150, in determining whether a given variable matches a given canonical representation, considers context of the given variable in the base source code snippet and the context of the given canonical representation in the target source code snippet. The context(s) considered by the variable mapping engine 150 can include, for example, position, type, preceding term(s) and/or following term(s). For example, the variable mapping engine 150 can compare the position of the given variable relative to other variable(s) in the base source code snippet to the position of the given canonical representation relative to other canonical representation(s) in the target source code snippet. For instance, if the given variable and the given canonical representation have the same relative positions, the variable mapping engine 150 can be more likely to consider them a match. As another example, the variable mapping engine 150 can additionally or alternatively compare the type assigned to given variable in the base source code snippet to the type assigned to the given canonical representation in the target source code snippet. For instance, if the types match, the variable mapping engine 150 can be more likely to consider them a match. As another example, the variable mapping engine 150 can additionally or alternatively compare preceding term(s) that immediately precede and/or following term(s) that immediately follow the given variable in the base source code snippet to preceding term(s) that immediately precede and/or following term(s) that immediately follow the given canonical representation in the target source code snippet. For instance, if the term(s) that immediately precede and/or immediately follow the given variable match those that immediately precede and/or immediately follow the given canonical representation, the variable mapping engine 150 can be more likely to consider them a match.

As one particular example, the variable mapping engine 150 can determine a given variable is a match to a canonical representation based on the given variable and the canonical representation both being of the same type (e.g., a "double"), both being the second variable/canonical representation positionally, and/or both being preceded and/or followed by certain term(s). For instance, a canonical representation of "v1" can be determined to match a variable of "width" based on "v1" being, in the target source code snippet, of a "double" type and being the second canonical representation, positionally, in the target source code snippet—and "width" likewise being, in the base source code snippet, of a "double" type and being the second variable, positionally, in the base source code snippet.

In some implementations, the variable mapping engine 150, in determining a variable for a canonical representation, can additionally or alternatively, for a given variable mapping in the target source code snippet (i.e., a given replacement of canonical representations with variables), generate output(s) that are each based on executing the target source code snippet (with the given variable mapping) with test input(s) (e.g., certain values for the variables). The variable mapping engine 150 can likewise generate output(s) for the initial base source code snippet, using the same test input(s). The base output(s) generated for the base source code snippet can be compared to the target output(s) generated for the target source code snippet. If the variable mapping engine 150 determines base output(s) match the target output(s), this can indicate that the given variable mapping is correct—and it can be utilized. In some implementations, the variable mapping engine 150 first determines one or more candidate variable mappings using context, then generates test base and target output(s) and compares them to verify one of the candidate variable mappings.

For example, a target source code snippet can include canonical representations of "v1", "v2", and "v3" and the base source code snippet can include variables of "width", "height", and "length". The base source code snippet can be executed with values of "1", "2", and "3" for respective of "width", "height", and "length" to generate base output. Further, the target source code snippet can be executed a first time with values of "1", "2", and "3" for respective of "v1", "v2", and "v3" to generate first target output, then with values of "2", "3", and "1" for respective of "v1", "v2", and "v3" to generate second target output, and so on until all permutations are attempted. If second target output matches the base output, but no other target outputs do, the mapping of v1=height, v2=length, and v3=width can be utilized. Additional base output(s) and target output(s), using different variable values, can likewise be generated to verify a variable mapping and/or to narrow down a correct variable mapping when initial test(s) indicate the base output matches multiple target outputs.

The modified target source code snippet, generated by the variable mapping engine 150, can then be provided to presentation engine 152. Presentation engine 152 can cause the modified target source code snippet to be rendered in a development application of client device 110. For example, the target source code snippet can be rendered in the development application for review and optional modification by a human developer.

As illustrated in FIG. 1, in some implementations, the client device 110 can have access to the PL 2 code database 168, and can cause (e.g., through a request), the target source code generation system 140 to translate all or portions of PL 2 code database 168 from the second programming language to the target first programming language (or another target language using a decompiler for that other target language). In some of those implementations, the presentation engine 152 can cause the development application of the client device to present multiple target source code snippets, each of which is a translation of a corresponding base source code snippet. Optionally, the target source code snippets can be presented along with (e.g., side by side) the base source code snippet of which it is a translation and/or along with a document string and/or other metadata for the base source code snippet. This can assist the developer in verifying the target source code snippet is an accurate translation of the base source code snippet.

Figure 3:
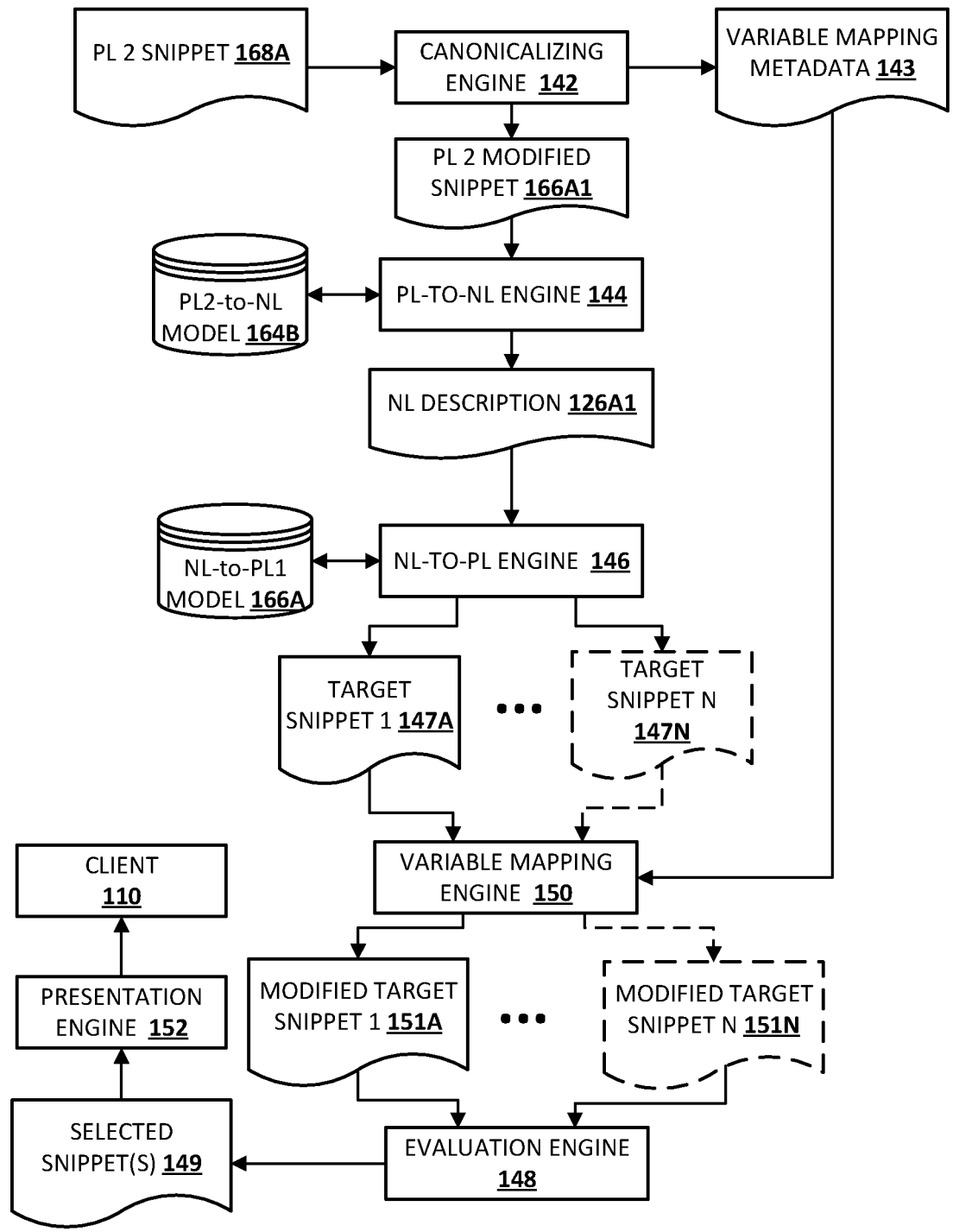
FIG. 3 is a block diagram showing an example of how components of the target source code generation system can translate a base source code snippet to a target source code snippet, in accordance with various implementations.

Turning now to FIG. 3, a block diagram is illustrated that shows an example of how components of the target source code generation system 140 can translate a base source code snippet 168A to a target source code snippet 149A, in accordance with various implementations.

In FIG. 3, a PL 2 snippet 168A, from PL 2 code database 168, is processed by the canonicalizing engine 142 to generate PL 2 modified snippet 166A1. The canonicalizing engine 142 can, in generating PL 2 modified snippet 166A1, replace variable(s) thereof with corresponding canonical representation(s). Further, the canonicalizing engine 142 can optionally provide variable mapping metadata 143 to variable mapping engine 150 for later use. The variable mapping metadata 143 can include, for example, contextual information for the variables, in PL 2 snippet 166A, that can be used by variable mapping engine 150 in determining which canonical variables, of a target source code snippet, match which variables of the base source code snippet.

The PL-to-NL engine 144 processes the PL 2 modified snippet 166A1 using the trained PL2-to-NL model 164B, to generate output(s). Further, the PL-to-NL engine 144 determines, based on the generated output(s), at least natural language description 126A1 of the PL2 modified snippet 166A1.

The NL-to-PL engine 146 processes the natural language description 126A1, using the trained NL-to-PL1 model 166A, to generate output(s). Further, the NL-to-PL engine 146 determines, based on the generated output(s), at least target snippet 1 147A. For example, multiple outputs can be generated that each include a corresponding probability distribution and the NL-to-PL engine 146 can generate target snippet 1 147A, token-by-token, by selecting the highest probability token indicated by each of the outputs. Optionally, the NL-to-PL engine 146 generates one or more additional target snippets, as indicated by the ellipsis and target snippet N 147N. When multiple target snippets are generated, the additional target snippets can each be based on one or more lower probability token(s) (e.g., as indicated by the output(s)).

Variable mapping engine 150 generates, for target snippet 1 147A, a modified target snippet 1 151A that replaces any canonical representations, in target snippet 1 147A, with corresponding matching variable(s) from the PL 2 snippet 168A. In doing so, the variable mapping engine 150 can consider contextual information included in variable mapping metadata 143 and/or utilize other technique(s) such as those described elsewhere herein. When additional target snippet(s) are generated, the variable mapping engine 150 can likewise generate modified versions thereof, as indicated by the ellipsis and modified target snippet N 151N.

The evaluation engine 148 can evaluate the modified target snippet 1 151A to determine whether it satisfies one or more evaluation conditions, such as those described elsewhere herein. In some implementations, the evaluation engine 148 can also evaluate additional modified target snippets, as indicated by the ellipsis and modified target snippet N 151N.

The evaluation engine 148 determines, based on the evaluation(s), whether to select modified target snippet 1 151A or another of the modified target snippets 151B-N. In some implementations or situations, the evaluation engine 148 selects only a single modified target snippet, such as the highest probability modified target snippet that satisfies all evaluation condition(s) and/or the modified target snippet whose evaluation metric(s) are better than all other modified target snippet(s). In some other implementations or situations, the evaluation engine 148 selects multiple modified target snippets, such as all that satisfy all evaluation condition(s) and/or the two or more modified target snippet whose evaluation metric(s) are better than all other non-selected modified target snippet(s).

The selected snippet(s) 149, selected by the evaluation engine 148, are then provided to presentation engine 152. The presentation engine 152 causes the selected snippet(s) 149 to be rendered (e.g., visually) on the client device 110. Where multiple selected snippets 149 are selected, they can optionally be presented as alternatives with graphical element(s) to enable a developer to choose one over the other(s). In response to selection of one of the graphical elements, that indicates a given one of the multiple selected snippets 149, the given one can remain visually displayed and/or maintained as a valid translation of the PL 2 snippet 168A— and all others no longer displayed and/or removed (e.g., from memory) as potential translations of the PL 2 snippet 168A.

Figure 4:
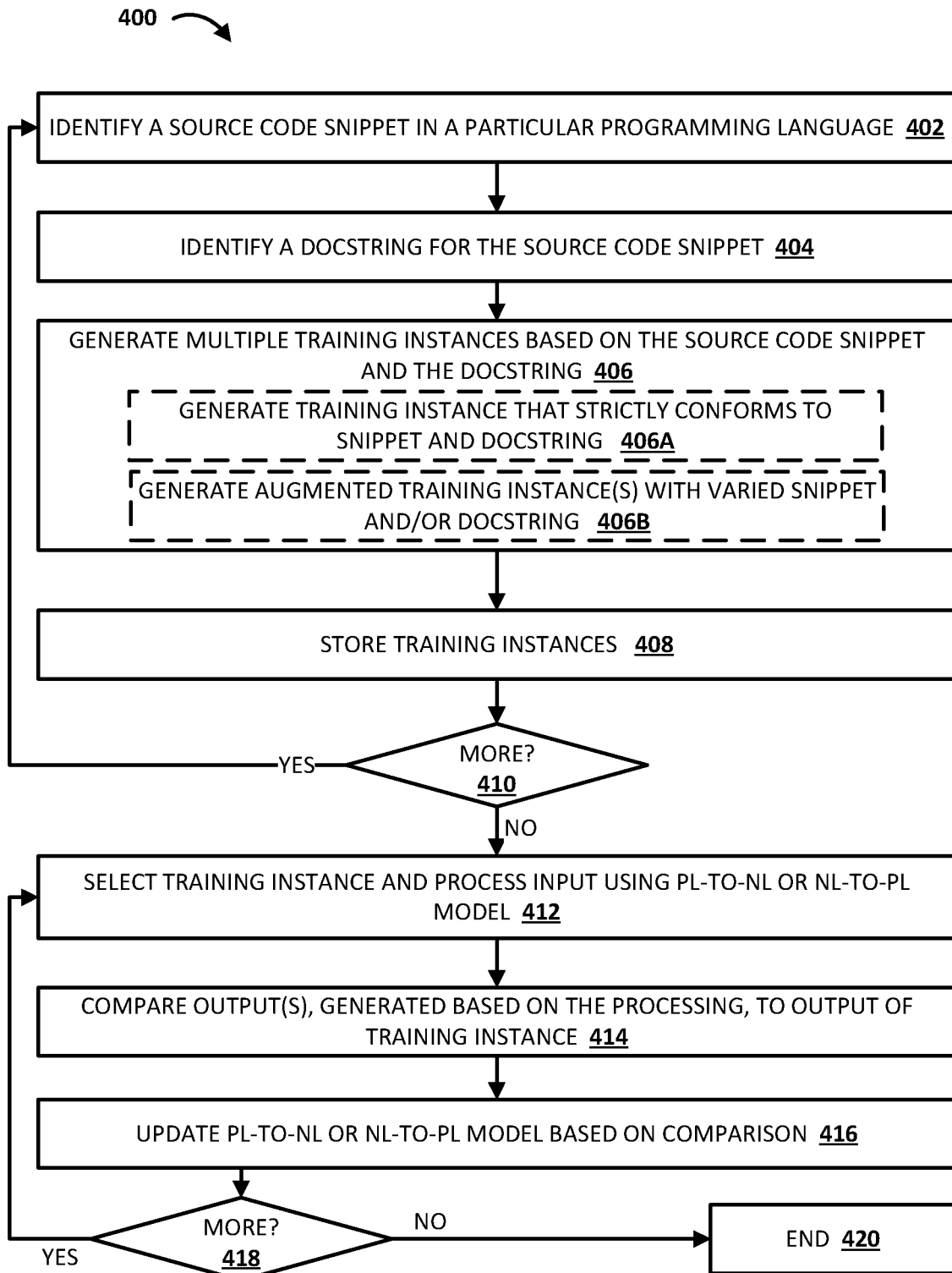
FIG. 4 is a flowchart illustrating an example method of generating training instances and training a PL-to-NL model and/or an NL-to-PL model based on the training instances.

Turning to FIG. 4, a flowchart is illustrated of an example method 400 of generating training instances and training a PL-to-NL model and/or an NL-to-PL model based on the training instances. For convenience, the operations of the flow chart are described with reference to a system that performs the operations. This system may include various components of various computer systems, such as one or more components of the training instance generation system 120 and the training engine 135. Moreover, while operations of method 400 are shown in a particular order, this is not meant to be limiting. One or more operations may be reordered, omitted or added.

At block 402, the system identifies a source code snippet that is in a particular programming language. For example, the particular programming language can be Python and the source code snippet can be a line of source code, or multiple lines of source code. In some implementations, the source code snippet is the original/initial one obtained from a source code database (e.g., submitted by a developer). In some other implementations, the source code snippet is one that has first been canonicalized (e.g., by canonicalizing engine 142 of FIG. 1) according to techniques described herein.

At block 404, the system identifies a docstring for the source code snippet.

At block 406, the system generates multiple training instances based on the source code snippet and the docstring.

Block 406 can optionally include sub-block 406A, in which the system generates a training instance that strictly conforms to the source code snippet (identified at block 402) and to the docstring (identified at block 404). For example, when generating a training instance for an NL-to-PL model for the particular language, the training instance can include the docstring as the training instance input, and can include the source code snippet as the training instance output. As another example, when generating a training instance for PL-to-NL model for the particular language, the training instance can include the source code snippet as the training instance input, and can include the natural language snippet as the training instance output. It is noted that an NL-to-PL training instance can be generated, and a corresponding PL-to-NL training instance generated by simply flipping the NL-to-PL training instance (and vice versa).

Block 406 can optionally additionally or alternatively include sub-block 406B, in which the system generates one or more augmented training instances that each vary from one another and that are each based on the source code snippet (identified at block 402) and the docstring (identified at block 404)—but include variation(s) of the source code snippet and/or variation(s) of the docstring. For example, at sub-block 406B the system can use one or more of the augmentation techniques described herein to generate multiple augmented training instances.

At block 408, the system stores the training instance(s) generated at block 406. In some implementations, the system At block 410, the system determines whether to generate more training instances. If so, the system proceeds back to block 402 to generate additional training instance(s). The system can determine to generate more training instances if a threshold quantity of training instances has yet to be generated, if a threshold duration of training instances generation has yet to elapse, and/or if unprocessed source code snippets in the particular programming language remain.

Blocks 402-410 describe training instance generation, whereas blocks 412-420 describe utilizing the training instances to train an NL-to-PL model for the particular language and/or a PL-to-NL model for the particular language. Block 412-420 can be performed responsive to a "no" determination at block 410 (i.e., after training instance generation is complete) and/or can be performed in parallel with training instance generation.

At block 412, the system selects a training instance, and processes input of the training instance using an NL-to-PL model for the particular language or a PL-to-NL model for the particular language. For example, if the selected training instance is an NL-to-PL training instance, the input can be processed using the NL-to-PL model.

At block 414, the system compares output(s), generated based on the processing, to output of the training instance. Comparing the output(s) generated based on the processing to output of the training instance can include determining a loss based on one or more comparisons.

In some implementations, the output(s) generated based on the processing include a sequence of outputs that each include a corresponding probability distribution over tokens. In some of those implementations, a predicted source code snippet (when NL-to-PL model being trained) can be determined, token-by-token, by selecting the highest probability token for each of the outputs. In some of those versions, one or more comparisons between the predicted source code snippet and the ground truth source code snippet of the training instance output can be made, and a loss determined based on the comparison(s). In some of those implementations, a predicted natural language description (when PL-to-NL model being trained) can be determined, token-by-token, by selecting the highest probability token for each of the outputs. In some of those versions, one or more comparisons between the predicted natural language description and the ground truth natural language description of the training instance output can be made, and a loss determined based on the comparison(s). The comparison(s) in either situation can include, for example, a Levenshtein distance or other string metric between the predicted and ground truth snippets. The comparison(s) can additionally or alternatively include, for example, a comparison between an embedding of the predicted source code snippet (or predicted natural language description) and an embedding of the ground truth source code snippet (or ground truth natural language description). Code2vec, CodeBERT and/or other model(s) can be used in generating embeddings of source code snippets. Word2vec and/or other model(s) can be used in generating embeddings of natural language descriptions.

In some additional and/or alternative implementations, a comparison between the probability distributions of the sequence of outputs and ground truth probability distributions can additionally or alternatively be utilized in determining the loss. For example, a first output can include a probability distribution that indicates the token of "double" has a 0.67 probability and can also indicate other lower probabilities for other tokens, and a second output can include a probability distribution that indicates the token of "add" has a 0.52 probability and can also indicate other lower probabilities for other tokens. The ground truth probability distribution can be based on the ground truth output of the training instance. For example, the ground truth target source code snippet of the training instance can include "double" and "add" in positions that correspond to the first and second output. As a result, a first ground truth probability distribution, that includes 1.0 for "double" and 0.0 for the other tokens, can be determined for the first output. Similarly, a second ground truth probability distribution, that includes 1.0 for "add", and 0.0 for the other tokens, can be determined for the second output. The loss can be based on comparing (e.g., using cross entropy) the probability distribution of the first output to the first ground truth probability distribution, the probability distribution of the second output to the second ground truth probability distribution, and probability distributions of other output(s) to corresponding ground truth probability distributions.

Additional and/or alternative techniques can be utilized in the comparison. Further, one or more of the technique described herein, and/or other technique(s), can be combined in determining a loss.

At block 416, the system updates the PL-to-NL model or the NL-to-PL model (in dependence on which is being trained in the current iteration of blocks 412, 414, 416) based on the comparison of block 414. For example, the system can back-propagate the loss to update weights of the model. It is noted that, in batch training techniques, the loss utilized to update the target language neural decompiler can be based on comparison(s) for multiple iterations of block 414. For example, an individual loss can be determined for each of multiple training instances at multiple iterations of block 414, and a cumulative loss, that is a function of the individual losses, can be used in the updating of block 414.

At block 418, the system determines whether to perform more training. If not, the system proceeds to block 420 and training ends. If so, the system proceeds back to block 412 to select additional training instance(s) on which to train. The system can determine to perform more training if a threshold quantity of training epochs have yet to be performed, if a threshold duration of training has yet to elapse, if unprocessed training instances remain, and/or if the so-far trained model fails to meet performance conditions. As referenced, it is noted that some iterations of blocks 412-420 can be used to train an NL-to-PL model for a particular language using NL-to-PL training instances, and other iterations of blocks 412-420 can be used to train a PL-to-NL model for the particular language using PL-to-NL training instances.

Figure 5:
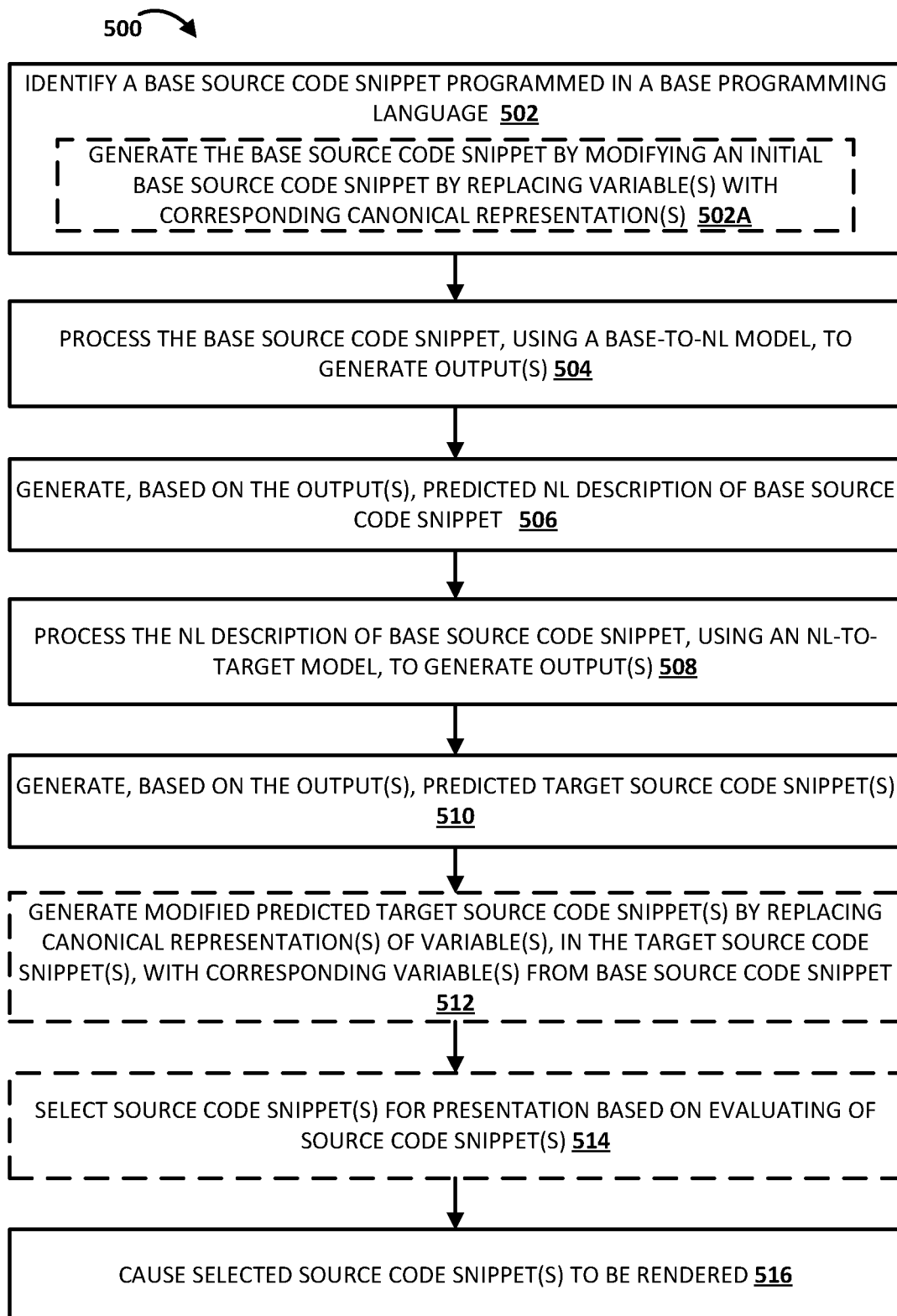
FIG. 5 is a flowchart illustrating an example method of translating a base source code snippet to a target source code snippet.

Turning to FIG. 5, a flowchart is illustrated of an example method 500 of translating a base source code snippet to a target source code snippet. For convenience, the operations of the flow chart are described with reference to a system that performs the operations. This system may include various components of various computer systems, such as one or more components of the target source code generation system 140. Moreover, while operations of method 500 are shown in a particular order, this is not meant to be limiting. One or more operations may be reordered, omitted or added.

At block 502, the system identifies a base source code snippet that is programmed in a base programming language. For example, the base language can be C++ and the base source code snippet can be a line of base source code, or multiple lines of base source code. In some implementations, the base source code snippet is an initial base source code snippet, such as one in a database and/or submitted by a developer and/or via a development application. In some other implementations, block 502 includes sub-block 502A and generates the base source code snippet by modifying an initial base source code snippet by replacing any variable(s) thereof with corresponding canonical representation(s).

At block 504, the system processes the base source code snippet, of block 502, using a base-to-NL model, to generate one or more outputs. The base-to-NL model can be, for example, one trained according to method 400 of FIG. 4.

At block 506, the system generates, based on the output(s) generated at block 504, a predicted natural language description of the base source code snippet. For example, a sequence of outputs, each having a corresponding probability distribution over tokens, can be generated at block 504, and the system can generate the predicted natural language description, token-by-token, by selecting the highest probability token indicated by each of the outputs.

At block 508, the system processes the natural language description, generated at block 506, using an NL-to-target model, to generate one or more outputs. The NL-to-target model can be, for example, one trained according to method 400 of FIG. 4.

At block 510, the system generates, based on the output(s) generated at block 508, one or more predicted target source code snippets. For example, assume a sequence of outputs are generated at block 508, where each output includes a corresponding probability distribution. In such an example, the system can generate a target source code snippet, token-by-token, by selecting the highest probability token indicated by each of the outputs. Optionally, the system can generate one or more additional target source code snippets, where each of the additional target source code snippets is based on one or more lower probability token(s) indicated by the output(s). Put another way, an additional target source code snippet can differ from the target source code snippet in at least one token is different and that at least one token is not the highest probability token of a corresponding output (e.g., it is instead the second highest, third highest, etc. probability).

At optional block 512, the system generates modified predicted source code snippet(s) by replacing canonical representation(s) of variable(s), in the target source code snippet(s), with corresponding variable(s) from the base source code snippet. For example, a modified predicted source code snippet can be generated that conforms to one of the target source code snippets, except that all canonical representation(s) of the target source code snippet are replaced with a matching variable from the base source code snippet. In some implementations, in determining whether a given variable matches a given canonical representation, the system considers context of the given variable in the base source code snippet and the context of the given canonical representation in the target source code snippet.

At optional block 514, the system selects one or more source code snippets for presentation based on evaluating the source code snippet(s). For example, the system can select a source code snippet, generated at block 510 or block 512, for presentation if one or more evaluations of the source code snippet satisfy evaluation condition(s). For instance, the source code snippet can be selected based on it conforming to syntax of the target programming language, being compilable using a compiler for the target programming language, having an embedding that is within a threshold distance of an embedding of the base source code snippet, and/or when executed with test input(s), having output(s) that match output(s) of the base source code snippet when executed with test input(s). As another example, a first source code snippet can be selected over a second source code snippet based on the first having an embedding that is closer distance-wise to an embedding of the base source code snippet than is an embedding of the second to the embedding of the base source code snippet.

At block 516, the source code snippet(s) selected at block 514 can be caused to be rendered (e.g., in a developer application).

Turning now to FIG. 6, example blocks are illustrated that may be performed in evaluating a target source code snippet, alone or in relation to other target source code snippet(s). For example, one or more of the blocks of FIG. 6 may be performed by the system during block 514 of method 500 of FIG. 5. For convenience, the operations of the blocks are described with reference to a system that performs the operations. This system may include various components of various computer systems, such as one or more components of the evaluation engine 148. Moreover, while blocks of method 600 are shown together, any of them may be performed alone, or in combination (serially or parallel) with other block(s).

At block 602, the system determines whether the target source code snippet conforms to syntax of the target programming language. If not, the system can remove the target source code snippet from consideration of being selected. If so, the system can select the target source code snippet, optionally contingent on the determination(s) of one or more other block(s) of FIG. 6.

At block 604, the system determines whether the target source code snippet can be compiled using a compiler for the target programming language. If not, the system can remove the target source code snippet from consideration of being selected. If so, the system can select the target source code snippet, optionally contingent on the determination(s) of one or more other block(s) of FIG. 6.

At block 606, the system determines whether output, of the target source code snippet, if compiled and executed, matches output of the base source code snippet if compiled and executed. For example, the system can apply test input(s) (i.e., certain value(s) for variable(s)) in executing the target source code snippet to generate target output, and can apply the same test input(s) in executing the base source code snippet to generate base output. If the system determines the target output does not match the base output, the system can remove the target source code snippet from consideration of being selected. If the system determines the target output does match the base output, the system can select the target source code snippet, optionally contingent on the determination(s) of one or more other block(s) of FIG. 6. Block 606 optionally includes sub-block 606A, in which the system considers multiple output(s) that are each based on different value(s) for variable(s) (i.e., different test input(s)). For example, the system can compare three or more target outputs to three or more base outputs, where each pair of base and target outputs is generated using a test input that differs from the test inputs used in generating all other of the target and base outputs.

At block 608, the system determines how distant, in embedding space, a generated target embedding for the target source code snippet is to a generated base embedding of the base source code snippet. For example, the system can generate the target embedding by processing the target source code snippet using a code2vec model or other model, and can generate the base embedding by processing the base source code snippet using the same model. In some implementations, the system determines to exclude the target source code snippet based on the distance between the target embedding and the base embedding being greater than a distance threshold. In some implementations, the system determines to select the target source code snippet based on the distance between the target embedding and the base embedding being less than a distance threshold, optionally contingent on the determination(s) of one or more other block(s) of FIG. 6. In some additional or alternative implementations, the system determines whether to select the target source code snippet based on comparing the distance between the target embedding and the base embedding, to an additional distance that is between the base embedding and an additional target embedding for an additional target source code snippet.

At block 604, the system considers size and/or complexity of the target source code snippet in determining whether to select it or remove it from consideration of being selected. For example, if the size and/or complexity are greater than a threshold and/or are greater than a size and/or complexity of an additional target snippet, the target source code snippet can be removed from selection consideration.

Figure 7:
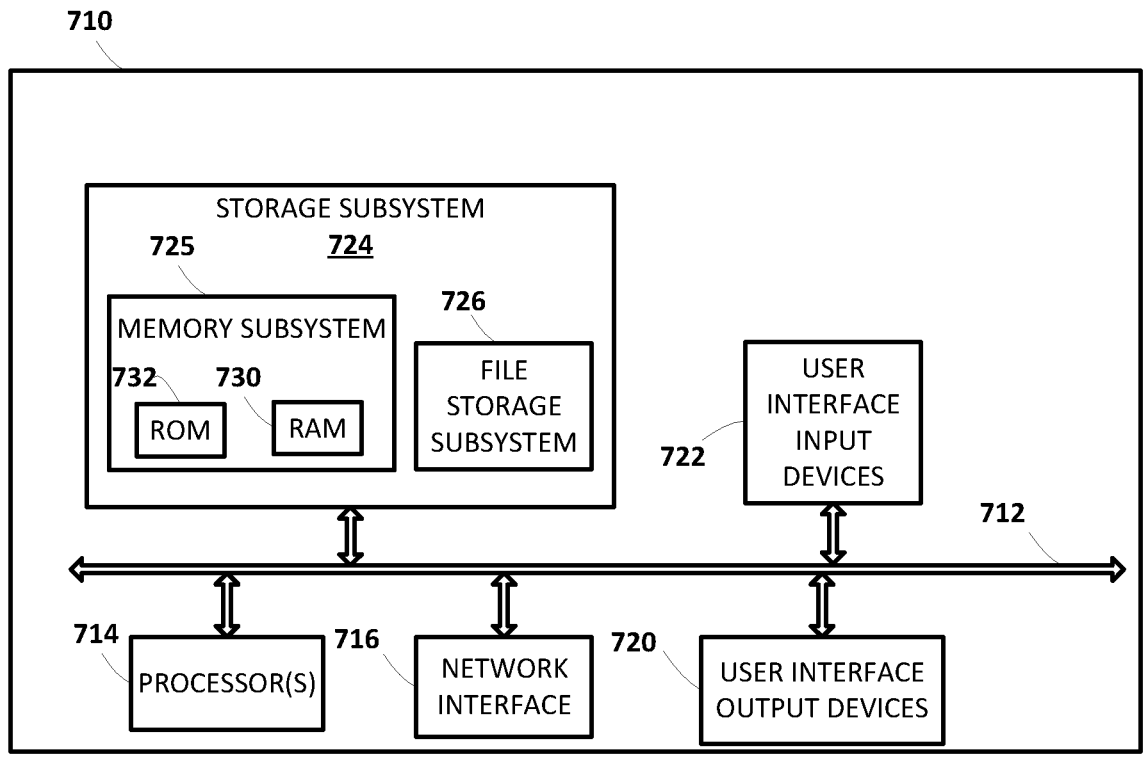
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of FIGS. 4, 5, and 6, as well as to implement various components depicted in FIGS. 1-3.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors is provided that includes identifying a base source code snippet that is programmed in a base higher-level programming language, and processing the base source code snippet, using a first neural network model, to generate a first sequence of first outputs. The method further includes generating, based on the first sequence of the first outputs, a natural language description of the base source code snippet, and processing the natural language description, using a second neural network model, to generate a second sequence of second outputs. The method further includes generating, based on the second sequence of the second outputs, a predicted target source code snippet in the target higher-level programming language, and causing the predicted target source code snippet to be rendered as output of a software development application.

This method and other implementations of technology disclosed herein may each optionally include one or more of the following features.

In some implementations, the base source code snippet is a modification of an initial base source code snippet, and the method further includes generating the base source code snippet by replacing a variable, in the initial base source code snippet, with a base canonical variable. In some versions of those implementations, generating the predicted target source code snippet in the target higher-level programming language includes determining that a given second output, of the second outputs, indicates a target canonical variable, determining that the target canonical variable corresponds to the variable in the initial base source code snippet, and generating the predicted target source code snippet by including the variable, in the predicted target source code snippet and in a location indicated by the given output. Including the variable can be responsive to determining that the target canonical variable corresponds to the variable in the initial base source code snippet.

In some further versions of those implementations, determining that the target canonical variable corresponds to the variable in the initial base source code snippet includes determining that an additional second output, in the second outputs, indicates a data type for the target canonical variable, and determining that the variable also has the data type in the initial base source code snippet. In other further versions of those implementations, determining that the target canonical variable corresponds to the variable in the initial base source code snippet includes determining that an additional second output, that immediately precedes or immediately follows the given second output in the second outputs, matches a portion of the base source code snippet that immediately precedes or immediately follows the variable in the base source code snippet.

In some implementations, the second outputs of the second sequence each comprise a corresponding probability distribution, and the method further includes generating, based on the corresponding probability distributions of the second outputs, an additional predicted target source code snippet, in the target higher-level programming language. The additional predicted target source code snippet can be generated based on highest probabilities in the corresponding probability distributions of the sequence of outputs. The method further includes generating, based on the corresponding probability distributions of the second outputs, the predicted target source code snippet. The predicted target source code snippet includes one or more portions that differ from the additional predicted target source code snippet based on the one or more portions being generated based on non-highest probabilities in the corresponding probability distributions of the second outputs. The method further includes evaluating the predicted target source code snippet and evaluating the additional predicted target source code snippet, and selecting, based on the evaluations, the predicted target source code snippet over the additional predicted target source code snippet. Causing the predicted target source code snippet to be rendered as output of the software development application can be responsive to selecting the predicted target source code snippet, and the additional predicted source code snippet may not be rendered as output of the software development application.

In some versions of those implementations, the method further includes executing the base source code snippet to generate a base source code output. Evaluating the additional predicted target source code snippet can include executing the additional target source code snippet to generate an additional target source code output, and determining that the base source code output fails to match the additional target source code output. Further, evaluating the predicted target source code snippet can include executing the predicted target source code snippet to generate a target source code output, and determining that the base source code matches the target source code output.

In some further versions of those implementations, generating the predicted target source code snippet and/or evaluating the predicted target source code snippet can be performed in response to determining that the base source code output fails to match the additional target source code output.

In other further versions of those implementations, evaluating the additional predicted target source code snippet can include analyzing the additional predicted target source code snippet with respect to a syntax for the target higher-level programming language, and determining that the additional predicted target source code snippet fails to conform to the syntax. Further, evaluating the predicted target source code snippet can include analyzing the predicted target source code language with respect to the syntax, and determining that the predicted target source code snippet conforms to the syntax. In yet further versions of those other implementations, generating the predicted target source code snippet and/or evaluating the predicted target source code snippet are performed in response to determining that the additional predicted target source code snippet fails to conform to the syntax.

In yet other further versions of those implementations, the method further includes generating, based on processing the base source code snippet using an additional neural network model, a base embedding of the base source code snippet. The method further includes generating, based on processing the additional predicted target source code snippet using the additional neural network model, an additional target embedding of the additional predicted target source code snippet. The method further includes generating, based on processing the predicted target source code snippet using the additional neural network model, a target embedding of the additional predicted target source code snippet. Evaluating the predicted target source code snippet and the additional predicted target source code snippet can include determining that the target embedding is closer, in embedding space, to the base embedding than is the additional target embedding to the base embedding.

In some implementations, the first neural network model comprises a plurality of transformers.

In some implementations, a method implemented by one or more processors is provided that includes identifying, from a repository, a target source code snippet that is programmed in a target programming language, and identifying, from the repository, a target document string for the target source code snippet. The method further includes generating multiple training instances based on the target source code snippet and the target document string. Each of the training instances may differs from all other of the training instances and each includes corresponding training instance input that is based on the target document string and corresponding training instance output that is based on the target source code snippet. The method further includes using the training instances to train a neural network model for use in generating target source code based on natural language.

This method and other implementations of technology disclosed herein may each optionally include one or more of the following features.

In some implementations, wherein generating the multiple training instances includes generating a first training instance with first training instance input that conforms strictly to the target document string, and with first training instance output that conforms strictly to the target source code or is the target source code with any variables replaced with a corresponding canonical representation, and generating a second training instance, with second training instance input that omits one or more words of the target document string and with second training instance output that conforms strictly to the first training instance output.

In some implementations, generating the multiple training instances includes generating a first training instance with first training instance input that conforms strictly to the target document string, and with first training instance output that conforms strictly to the target source code or is the target source code with any variables replaced with a corresponding canonical representation, and generating a second training instance, with second training instance input that replaces a word, of the target document string, that matches a first data type with an alternate word that matches a second data type and with second training instance output that includes a modification of the target source code that replaces, in the target source code, a term that matches the data type with an alternate term that matches the second data type.

In some implementations, generating the multiple training instances includes generating a first training instance with first training instance output that replaces a term of the target source code, that corresponds to a variable, with a first alternate term, and generating a second training instance with second training instance output that replaces a term of the target source code, that corresponds to a variable, with a second alternate term. In some versions of those implementations, generating the first training instance further includes generating a first training instance input, of the first training instances, that replaces any occurrences of the term, in the target document string, with the first alternate term.

Generating the second training instance further includes generating a second training instance input, of the second training instance, that replaces any occurrences of the term, in the target document string, with the second alternate term.

In some implementations, generating the multiple training instances can include generating a first training instance with first training instance input that replaces a term of the target document string with a synonym, and generating a second training instance with second training instance input that includes the term, or that replaces the term with an alternate synonym.

In some implementations, the method further includes, subsequent to using the training instances to train the neural network model, processing, using the neural network model, a given instance of natural language, and generating, based on processing the given instance of natural language, a given target source code snippet. In some versions of those implementations, the method further includes identifying, from a repository, a base source code snippet that is programmed in a base programming language, identifying, from the repository, a base document string for the base source code snippet, and generating multiple base training instances based on the base source code snippet and the base document string. Each of the base training instances differs from all other of the base training instances and each includes corresponding base training instance output that is based on the base target document string and corresponding base training instance input that is based on the base target source code snippet. The method further includes using the base training instances to train a base neural network model for use in generating natural language based on base source code. In some further versions of those implementations, the method further includes, subsequent to using the training instances to train the base neural network model, processing, using the base neural network model, a given base source code snippet in the base programming language, and generating, based on processing the given base source code snippet, the given instance of natural language.

Other implementations may include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
    identifying a base natural language description that is descriptive of a base source code snippet that is programmed in a base higher-level programming language;
    processing the natural language description, using a neural network model, to generate a sequence of outputs that each comprise a corresponding probability distribution;
    generating, based on the corresponding probability distributions of second outputs: a predicted target source code snippet that is in a target higher-level programming language that differs from the base higher-level programming language, and an additional predicted target source code snippet that is in the target higher-level programming language and that includes one or more portions that differ from the predicted target source code snippet;
    evaluating the predicted target source code snippet and evaluating the additional predicted target source code snippet;
    selecting, based on the evaluations, the additional predicted target source code snippet over the predicted target source code snippet; and
    responsive to selecting the additional predicted target source code snippet:
        causing the additional predicted target source code snippet to be rendered as output of a software development application,
            wherein the predicted source code snippet is not rendered as output of the software development application.

2. The method of claim 1, wherein the predicted target source code snippet is generated based on highest probabilities in the corresponding probability distributions of the sequence of outputs.

3. The method of claim 2, wherein the additional predicted target source code snippet is generated based on one or more non-highest probabilities in the corresponding probability distributions of the second outputs.

4. The method of claim 1, further comprising:
    identifying the base source code snippet;
    executing the base source code snippet to generate a base source code output; wherein evaluating the additional predicted target source code snippet comprises:
        executing the additional target source code snippet to generate an additional target source code output, and
        determining that the base source code output matches the additional target source code output; and
    wherein evaluating the predicted target source code snippet comprises:
        executing the predicted target source code snippet to generate a target source code output; and
        determining that the base source code output fails to match the predicted target source code output.

5. The method of claim 4, wherein generating the additional predicted target source code snippet is performed in response to determining that the base source code output fails to match the predicted target source code output.

6. The method of claim 4, wherein evaluating the additional predicted target source code snippet is performed in response to determining that the base source code output fails to match the predicted target source code output.

7. The method of claim 1,
    wherein evaluating the additional predicted target source code snippet comprises:
        analyzing the additional predicted target source code snippet with respect to a syntax for the target higher-level programming language, and
        determining that the additional predicted target source code snippet conforms to the syntax; and
    wherein evaluating the predicted target source code snippet comprises:
        analyzing the predicted target source code language with respect to the syntax;

and
determining that the predicted target source code snippet fails to conform to the syntax.

8. The method of claim 7, wherein generating the additional predicted target source code snippet is performed in response to determining that the predicted target source code snippet fails to conform to the syntax.

9. The method of claim 7, wherein evaluating the additional predicted target source code snippet is performed in response to determining that the predicted target source code snippet fails to conform to the syntax.

10. The method of claim 1, further comprising:
identifying the base source code snippet;
generating, based on processing the base source code snippet using an additional neural network model, a base embedding of the base source code snippet;
generating, based on processing the additional predicted target source code snippet using the additional neural network model, an additional target embedding of the additional predicted target source code snippet; and
generating, based on processing the predicted target source code snippet using the additional neural network model, a target embedding of the additional predicted target source code snippet;
wherein evaluating the predicted target source code snippet and the additional predicted target source code snippet comprises:
determining that the additional target embedding is closer, in embedding space, to the base embedding than is the target embedding to the base embedding.

11. The method of claim 1, wherein the neural network model comprises a transformer.

12. A method implemented by one or more processors, the method comprising:
identifying, from a repository, a target source code snippet that is programmed in a base programming language;
identifying, from the repository, a base document string for the base source code snippet;
generating multiple training instances based on the base source code snippet and the base document string, wherein each of the training instances differs from all other of the training instances and each includes corresponding training instance input that is based on the base document string and corresponding training instance output that is based on the base source code snippet;
using the training instances to train a neural network model for use in generating natural language based on base source code.

13. The method of claim 12, wherein generating the multiple training instances comprises:
generating a first training instance with first training instance output that conforms strictly to the base document string, and with first training instance input that conforms strictly to the base source code or is the base source code with any variables replaced with a corresponding canonical representation; and
generating a second training instance with second training instance output that omits one or more words of the base document string, and with second training instance input that conforms strictly to the first training instance output.

14. The method of claim 12, wherein generating the multiple training instances comprises:
generating a first training instance with first training instance output that conforms strictly to the base document string, and with first training instance input that conforms strictly to the base source code or is the base source code with any variables replaced with a corresponding canonical representation; and
generating a second training instance, with second training instance output that replaces a word, of the base document string, that matches a first data type with an alternate word that matches a second data type, and with second training instance input that includes a modification of the base source code that replaces, in the base source code, a term that matches the data type with an alternate term that matches the second data type.

15. The method of claim 12, wherein generating the multiple training instances comprises:
generating a first training instance with first training instance input that replaces a term of the base source code, that corresponds to a variable, with a first alternate term; and
generating a second training instance with second training instance input that replaces a term of the base source code, that corresponds to a variable, with a second alternate term.

16. The method of claim 15,
wherein generating the first training instance further comprises generating a first training instance output, of the first training instances, that replaces any occurrences of the term, in the base document string, with the first alternate term; and
wherein generating the second training instance further comprises generating a second training instance output, of the second training instance, that replaces any occurrences of the term, in the base document string, with the second alternate term.

17. The method of claim 12, wherein generating the multiple training instances comprises:
generating a first training instance with first training instance output that replaces a term of the base document string with a synonym; and
generating a second training instance with second training instance output that includes the term, or that replaces the term with an alternate synonym.

18. The method of claim 12, further comparing, subsequent to using the training instances to train the neural network model:
processing, using the neural network model, a given base source code snippet; and
generating, based on processing the given base source code snippet, a given natural language description of the base source code snippet.

* * * * *